US011415990B2

United States Patent
Das et al.

(10) Patent No.: US 11,415,990 B2
(45) Date of Patent: Aug. 16, 2022

(54) OPTICAL OBJECT TRACKING ON FOCAL PLANE WITH DYNAMIC FOCAL LENGTH

(71) Applicant: Honeywell International Inc., Charlotte, NC (US)

(72) Inventors: Shouvik Das, Bangalore (IN); Nikhil Gupta, Chandigarh (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/001,309

(22) Filed: Aug. 24, 2020

(65) Prior Publication Data
US 2021/0341922 A1 Nov. 4, 2021

(30) Foreign Application Priority Data
May 4, 2020 (IN) .............................. 202011018921

(51) Int. Cl.
G05D 1/00 (2006.01)
B64D 47/08 (2006.01)
G06T 7/73 (2017.01)

(52) U.S. Cl.
CPC .......... *G05D 1/0094* (2013.01); *B64D 47/08* (2013.01); *G06T 7/73* (2017.01); *B64C 2201/127* (2013.01); *G06T 2207/10032* (2013.01)

(58) Field of Classification Search
CPC ........ G05D 1/0094; B64D 47/08; G06T 7/73; G06T 2207/10032; B64C 2201/127
See application file for complete search history.

(56) References Cited

U.S. PATENT DOCUMENTS

| | | | |
|---|---|---|---|
| 7,970,507 B2 | 6/2011 | Fregene et al. | |
| 9,442,485 B1 | 9/2016 | McDermott et al. | |
| 9,769,387 B1* | 9/2017 | Beard | G06K 9/0063 |
| 10,129,478 B2 | 11/2018 | Zhao et al. | |
| 2003/0048357 A1 | 3/2003 | Kain et al. | |
| 2010/0079101 A1* | 4/2010 | Sidman | F16M 11/041 |
| | | | 318/649 |
| 2018/0246529 A1 | 8/2018 | Hu et al. | |

(Continued)

OTHER PUBLICATIONS

Opromolla et al., "A Vision-Based Approach to UAV Detection and Tracking in Cooperative Applications," MDPI, Sensors, vol. 18, Oct. 10, 2018, 26 pp.

(Continued)

*Primary Examiner* — Nasim N Nirjhar
(74) *Attorney, Agent, or Firm* — Shumaker & Sieffert, P.A.

(57) ABSTRACT

A method of tracking an image feature is described. The method comprises acquiring an image with a camera, and determining, using processing circuitry, a bounding area in the image, the bounding area surrounding a feature in the image. The method further comprises determining, using processing circuitry, a rotation axis and a rotation angle based on a first focal length of the camera and a position of the bounding area relative to a center of the image. The method further comprises determining, using processing circuitry, at least one of a pan angle, a roll angle, and a tilt angle for the camera at which the bounding area is centered in the image. The method further comprises adjusting, using a gimbal, an orientation of the camera based on the at least one of the pan angle, the roll angle, and the tilt angle.

18 Claims, 7 Drawing Sheets

(56) References Cited

U.S. PATENT DOCUMENTS

2018/0295335 A1\* 10/2018 Burgess ................. G01S 19/31
2019/0096069 A1\* 3/2019 Qian .................... G05D 1/0094

OTHER PUBLICATIONS

Metni et al., "A UAV for bridge inspection: Visual servoing control law with orientation limits," Elsevier, Automation in Construction, vol. 17, Issue 1, Nov. 2007, pp. 3-10.

Deng et al., "Characteristics of Robot Visual Servoing Methods and Target Model Estimation," Proceedings of the 2002 IEEE International Symposium on Intelligent Control, Vancouver, Canada, Oct. 27-30, 2002, 6 pp.

\* cited by examiner

OPTICAL OBJECT TRACKING ON FOCAL PLANE WITH DYNAMIC FOCAL LENGTH

This application claims the benefit of Indian Provisional Patent Application No. 202011018921, entitled "OPTICAL OBJECT TRACKING ON FOCAL PLANE WITH DYNAMIC FOCAL LENGTH" and filed on May 4, 2020, the entire content of which is incorporated herein by reference.

TECHNICAL FIELD

The disclosure relates to image-based object tracking.

BACKGROUND

Aerial imagery and photogrammetry are commonly included in vehicles, including unmanned aerial vehicles (UAVs), in which a pilot controls the orientation pan (azimuth), tilt (pitch), roll, and zoom of a camera system on the vehicle. In some instances, it may be preferable to have the orientation of the camera be controlled via an automated gimbal such that the pilot may focus on control of the vehicle.

SUMMARY

In some examples, this disclosure describes a method of tracking an image feature comprising: acquiring an image with a camera; determining, using processing circuitry, a bounding area in the image, the bounding area surrounding a feature in the image; determining, using processing circuitry, a rotation axis and a rotation angle based on a first focal length of the camera and a position of the bounding area relative to a center of the image; determining, using processing circuitry, at least one of a pan angle, a roll angle, and a tilt angle for the camera at which the bounding area is centered in the image; and adjusting, using a gimbal, an orientation of the camera based on the at least one of the pan angle, the roll angle, and the tilt angle.

In some examples, this disclosure describes a system comprising: a camera; and processing circuitry configured to: receive, from the camera, an image including at least one feature; determine a bounding area in the image surrounding the at least one feature; determine a rotation axis and a rotation angle based on a first focal length of the camera and a position of the bounding area relative to a center of the image; and determine at least one of a pan angle, a roll angle, and a tilt angle for the camera at which the bounding area is centered in the image; and adjust, using a gimbal, an orientation of the camera about the rotation axis and the rotation angle based on the at least one of the pan angle, the roll angle, and the tilt angle.

In some examples, this disclosure describes a method of servoing a camera comprising: determining a bounding area, the bounding area including a feature in a sequence of images of a camera; determining a rotation axis and a rotation angle based on the focal length of the camera and the position of the bounding area relative to the center of the image; determining at least one of a pan angle, a roll angle, and a tilt angle such that the bounding area is centered in the image based on the rotation axis and the rotation angle and without basing the at least one of the pan angle, the roll angle, and the tilt angle on the distance between the feature and the camera; and servoing the camera based on the at least one of the pan angle, the roll angle, and the tilt angle such that the bounding area is centered in the image.

The details of one or more examples are set forth in the accompanying drawings and the description below. Other features, objects, and advantages will be apparent from the description and drawings, and from the claims.

DETAILED DESCRIPTION

Aerial imagery and photogrammetry have flourished with the advent of unmanned systems equipped with high resolution cameras and two- or three-axis gimbals. Camera systems have become common payload in many unmanned aerial vehicles (UAV) where the user controls the orientation pan (azimuth), tilt (pitch), roll and zoom remotely, for example, using radio signals.

However, with critical missions it may be preferable to control the orientation of the camera automatically so that the remote pilot can focus on piloting the vehicle. For example, missions carried out in places with dense features (powerlines, vegetations, roads etc.) where it is imperative the object of interest is given maximum importance while framing the image for the analytics requires that an object of importance be detected automatically and kept in the frame of the image being taken almost all the time. As such, it is desirable to control the orientation of the camera based on the focal length (zoom) of the camera and independently of the camera-to-object distance.

The orientation of the gimbal is usually controlled using events such as tracking a position on the ground using Latitude, Longitude, and Altitude (LLA) coordinates while the relative motion of the carrier UAV continuously changes. Another common method of automated orientation control is visual servoing, for example, in which a distinguishing feature from the live stream of the camera, e.g., a feature in the image corresponding to an object of importance in the real-world scene, is identified in real-time using computer vision techniques, and corrections are generated based on the flow of motion detected for that distinguishing feature.

In conventional automated servoing systems, it is difficult to determine camera system orientation corrections because it is difficult to determine how much of an angle is subtended a feature corresponding to an object in a real-world scene as the object position changes relative to the camera position. In other words, the absence of camera-to-object distance information makes it difficult to track an object. In some instances, calibration of the camera system using known image markers to sense the real-world dimensions is may be required, in other instances a plurality of cameras may be required to triangulate the object in an earth-frame coordinate system, e.g., real-world scene coordinates.

A challenge with visual servoing is that as the absolute distance between the camera and the object in the real-world scene corresponding to the feature in the image changes, the rate of error closure be controlled by either changing the servoing control-loop gains, or by having schedules for different usage paradigms. Also, changes in focal length of the camera, e.g., zoom, requires changes to the servoing control-loop gains. As such, constructing a universal control regime agnostic of both the distance between camera and object and the focal length of the optics used is problematic.

In some examples, this disclosure is directed towards tracking an object in a real-world scene via determining the pan, roll, and tilt angles required to center a feature in an image corresponding to the object in an earth-frame coordinate system and adjusting the orientation of a camera system based on the determined pan, roll, and tilt angles. For example, a computing device may automatically determine the pan, roll, and tilt angles for an orienting system on which the camera is mounted to actuate to, based on the focal length of the camera system and without changing servoing control-loop gains of the orienting system. In addition, the pan, roll, and tilt angles may be determined independent of the camera-to-object distance.

In some examples, the techniques and systems of this disclosure may enable flexibility of the camera systems used for aerial imagery and photogrammetry. For example, either one or both of the camera body including a sensor array, or the camera lens, may be modified or replaced without having to modify servoing parameters, such as control-loop gains and/or control-loop algorithms. Such replacements and/or modifications may also be made without having to perform a calibration. As such, the image of an object of importance may be optimally framed for use by image-based analytics as well as for continued tracking of the object over time. Additionally, various control schemes for differing camera systems may be obviated, thereby reducing downtime for a vehicle in which differing camera systems may be required. Also, the burden of maintaining various control-loop algorithms and gains and their associated correlation to varying camera systems may be reduced and/or eliminated. In other words, pilots may swap camera systems without having to make further adjustments to servoing algorithms and/or parameters. Further still, limitation of having to fly within a predetermined range from an object of interest is reduced and/or eliminated.

Figure 1:
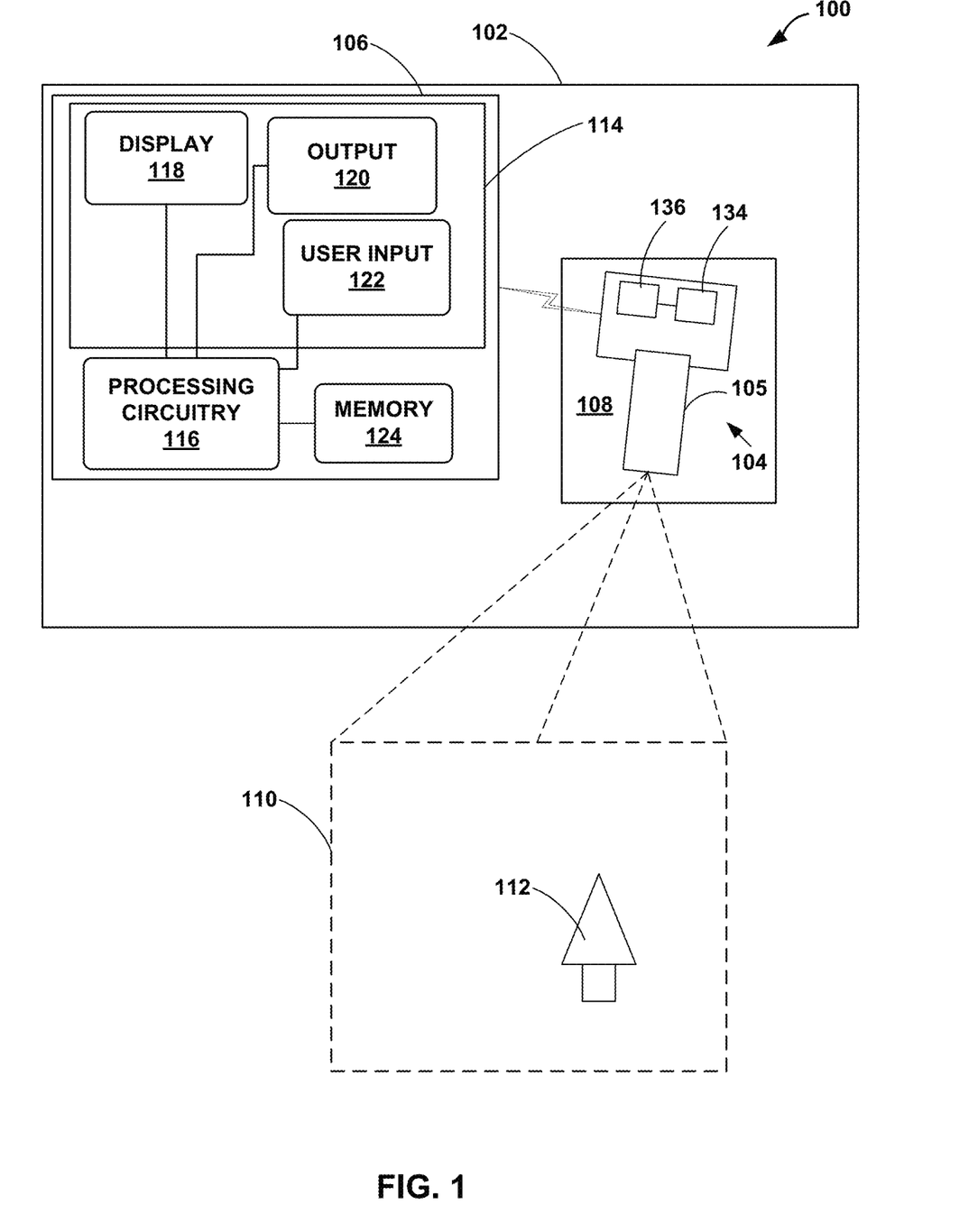
FIG. 1 is a conceptual diagram of a tracking system that includes a vehicle and a real-world scene, in accordance with one or more techniques of this disclosure.

FIG. 1 is a conceptual diagram of a tracking system environment 100, in accordance with one or more techniques of this disclosure. In the example shown, environment 100 includes a vehicle 102 and a real-world scene 110 that may include object 112. Object 112 may be, for example, an object of importance, an object of interest, a tracking object, or the like.

In some examples, vehicle 102 may be a UAV, a drone, a helicopter, an aircraft, a watercraft, a land-based vehicle such as a car, truck, van, etc., a bicycle, or any type of motor-powered or human-powered vehicle. In the example shown, vehicle 102 includes computing device 106 and orienting system 108. In some examples, computing device 106 may be located remote to vehicle 102 and may communicate with vehicle 102 and/or orienting system 108 via a communication interface.

In some examples, orienting system 108 may be a multi-axis gimbal, for example, a two-axis gimbal, a three-axis gimbal, or any type of gimbal. In other examples, orienting system may be any type of system configured to orient a camera system to view a desired scene, e.g., real-world scene 110. In the example shown, camera 104 including lens 105 may be fixably attached to orienting system 108.

In the example shown, camera 104 includes lens 105. In some examples, lens 105 may be a variable lens, e.g., a zoom lens and/or telephoto lens having a variable focal length. In other examples, lens 105 may be detachable from camera 104, and an alternative lens may replace lens 105, for example, a wide-angle lens, a wavelength-filtered lens, and the like.

In some examples, camera 104 may be configured to capture an image of a real-world scene, e.g., real-world scene 110. Camera 104 may be any type of camera or video camera capable of capturing at least one image, and/or a sequence of images, and/or video. The sequence of images may be two or more images taken at regular or irregular intervals. For example, a sequence of images may include a video stream of images taken at 200 Hz, 350 Hz, 500 Hz, 1000 Hz, or at any other frequency usable for tracking objects.

In some examples, camera 104 may be communicatively coupled, for example by a wired or a wireless connection, to computing device 106 and a captured image, image sequence, video, etc., may be transferred to computing device 106, for example, for image processing such as that described below. In some examples, camera 104 may include processing circuitry 136 and memory 134 and may process the image and/or video without transferring the image and/or video to computing device 106.

In the illustrated example, computing device 106 may include processing circuitry 116 coupled to memory 124 and to display 118, output 120, and user input 122 of a user interface 114. Processing circuitry 116 of computing device 106, as well as processing circuitry 136 of camera 104, and other processing modules or circuitry described herein, may be any suitable software, firmware, hardware, or combination thereof. Processing circuitry 116 and 136 may include any one or more microprocessors, controllers, digital signal processors (DSPs), application specific integrated circuits (ASICs), field-programmable gate arrays (FPGAs), or discrete logic circuitry. The functions attributed to processors described herein, including processing circuitry 116 and 136, may be provided by processing circuitry of a hardware device, e.g., as supported by software and/or firmware.

In some examples, processing circuitry 116, as well as processing circuitry 136, is configured to determine orientation information associated with tracking an object in a real-world scene. For example, processing circuitry 116 may determine pan, roll, and tilt angles for orienting system 108 to center object 112 in the field of view of camera 104 based on an image, or images, of real-world scene 110 captured by camera 104. Processing circuitry 116 and 136 may perform any suitable signal processing of a sequence of images to filter the sequence of images, such as any suitable band-pass filtering, adaptive filtering, closed-loop filtering, any other suitable filtering, analytical, regression, machine learning, or processing as described herein, and/or any combination thereof. Processing circuitry 116 and 136 may also receive input signals from additional sources (not shown). For example, processing circuitry 116 may receive an input signal containing position information, such as Global Navigation Satellite System (GNSS) coordinates of vehicle 102. Additional input signals may be used by processing circuitry 116 and 136 in any of the calculations or operations it performs. In some examples, processing circuitry 116 and 136 may be adapted to execute software, which may include an operating system and one or more applications, as part of performing the functions described herein. In some examples, processing circuitry 116 and 136 may include one or more processing circuitry modules for performing each or any combination of the functions described herein.

In some examples, processing circuitry 116 may be coupled to memory 124, and processing circuitry 136 may be coupled to memory 134. Memory 124, as well as memory 134, may include any volatile or non-volatile media, such as a random-access memory (RAM), read only memory (ROM), non-volatile RAM (NVRAM), electrically erasable programmable ROM (EEPROM), flash memory, and the like. Memory 124 and 134 may be a storage device or other non-transitory medium. Memory 124 and 134 may be used by processing circuitry 116 and 136, respectively, for example, to store information corresponding vehicle 102 position and/or tracking object 112. In some examples, processing circuitry 116 and 136 may store measurements, previously received data from an image or a sequence of images in memory 124 and 134, respectively, and/or calculated values for later retrieval.

Processing circuitry 116 may be coupled to user interface 114 including display 118, user input 122, and output 120. In some examples, display 118 may include one or more display devices (e.g., monitor, personal digital assistant (PDA), mobile phone, tablet computer, any other suitable display device, or any combination thereof). For example, display 118 may be configured to display an image and/or tracking information. In some examples, user input 122 is configured to receive input from a user, e.g., information corresponding to vehicle 102, orienting system 108, and/or camera 104. For example, a user may input information such as camera parameters, e.g., camera type, lens focal length, exposure time, video capture rate, lens aperture, and the like.

User input 122 may include components for interaction with a user, such as a keypad and a display, which may be the same as display 118. In some examples, the display may be a cathode ray tube (CRT) display, a liquid crystal display (LCD) or light emitting diode (LED) display and the keypad may take the form of an alphanumeric keypad or a reduced set of keys associated with particular functions. User input 122, additionally or alternatively, include a peripheral pointing device, e.g., a mouse, via which a user may interact with the user interface. In some examples, the displays may include a touch screen display, and a user may interact with user input 122 via the touch screens of the displays. In some examples, the user may also interact with user input 122 remotely via a networked computing device.

In the example shown, real-world scene 110 may include one or more objects within the field of view of camera 104, such as object 112.

To track an object in real-world scene 110, such as object 112, orienting system 108 may change one or more of a pan, roll, and tilt angle. In some examples, computing device 106 may automatically determine one or more of a pan, roll, and tilt angle based on the focal length of lens 105 and independent of the distance between object 112 and camera 104. For example, computing system 106 may receive an image of real-world scene 110 from camera 104. Computing system 106 may determine a bounding area within the image that surrounds a feature in the image, e.g., object 112. In some examples, computing system 106 may determine a plurality of bounding areas within the image, each bounding area surrounding one or more features in the image. For example, tracking may be based on a plurality of features within one or more images of a sequence of images. Computing system 106 may further determine a rotation axis and rotation angle based on a focal length of lens 105 of camera 104 and based on a position of the bounding area relative to the center of the image. Computing system 106 may further determine at least one of a pan angle, a roll angle, and/or a tilt angle for camera 104 at which the bounding area is centered in the image. Computing system 106 may further communicate the at least one pan, roll, and/or tilt angle to vehicle 102 and/or orienting system 108 and may cause orienting system 108 to adjust the orientation of camera 104 based on the determined at least one pan, roll, and/or tilt angle.

Figure 2:
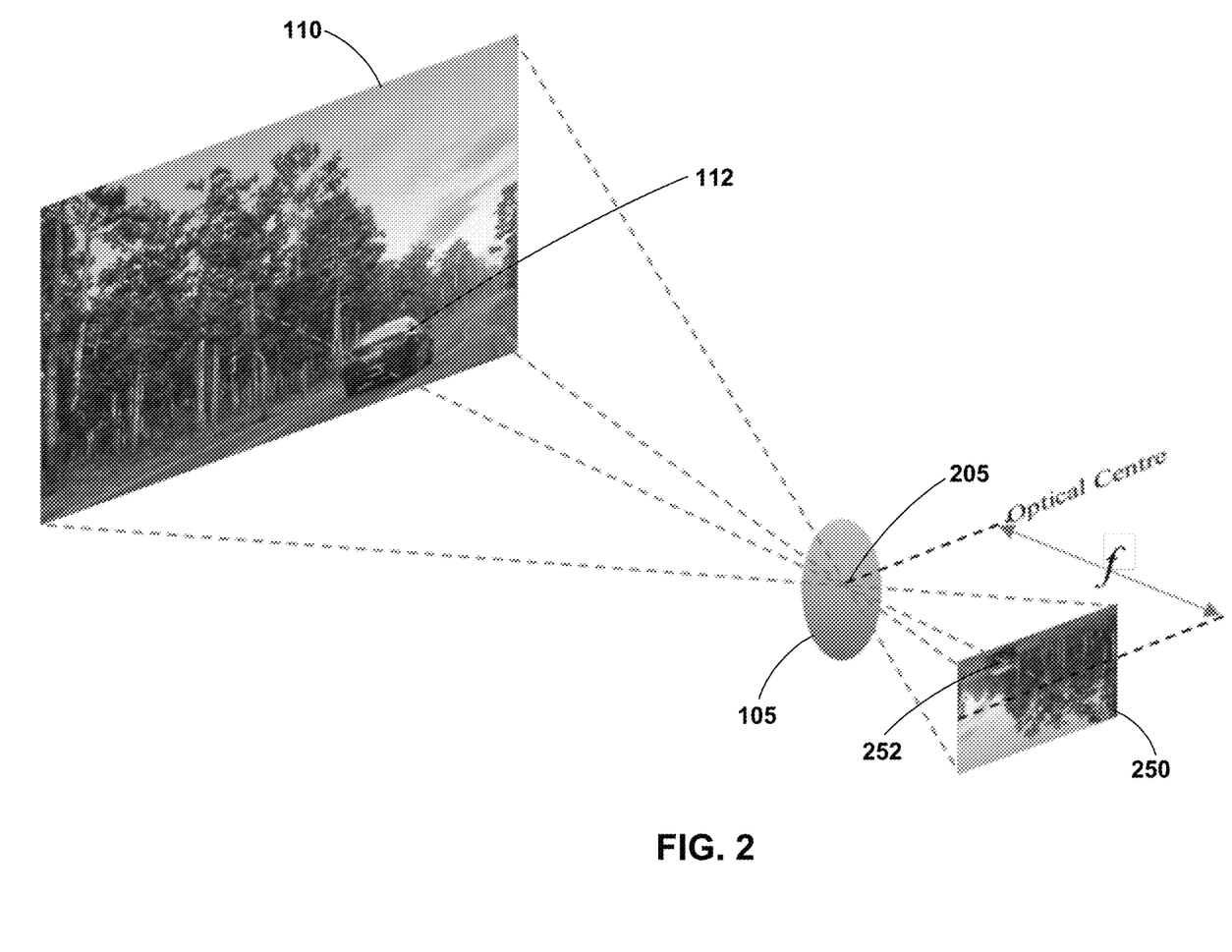
FIG. 2 is a conceptual diagram illustrating a perspective view of an example image of a real-world scene captured via a camera, in accordance with one or more techniques of this disclosure.

FIG. 2 is a conceptual diagram illustrating a perspective view of an example image 250 of a real-world scene 110 captured via a camera, in accordance with one or more techniques of this disclosure. The example shown includes real-world scene 110, lens 105, and image 250. In the example shown, real-world scene 110 includes object of importance 112, and image 250 of real-world scene 110 includes feature 252. In the example shown, feature 252 may be the corresponding image of object of importance 112.

In the example shown, lens 105 is illustrated as a single-element positive lens with a positive focal length f. In some examples, lens 105 may be a multi-element lens, a telephoto lens, or any type of image forming lens.

In the example shown, image 250 of real-world scene 110 is formed at f by lens 105. In some examples, an array of sensors, e.g., a focal plane array of camera pixels, may be positioned at f so as to capture image 250, for example, as a digital image. In some examples, the field of view of a camera may be determined by the focal length f and the spatial extent of the image capture medium, e.g., film, or a focal plane array. In the example shown, the field of view is illustrated by the dashed lines from each corner of image 250 through optical center 205 of lens 105 to an opposing corner of real-world scene 110. In some examples, optical center 205 of lens 105 may be a cardinal point of lens 105, for example, a nodal point of lens 105.

Figure 3:
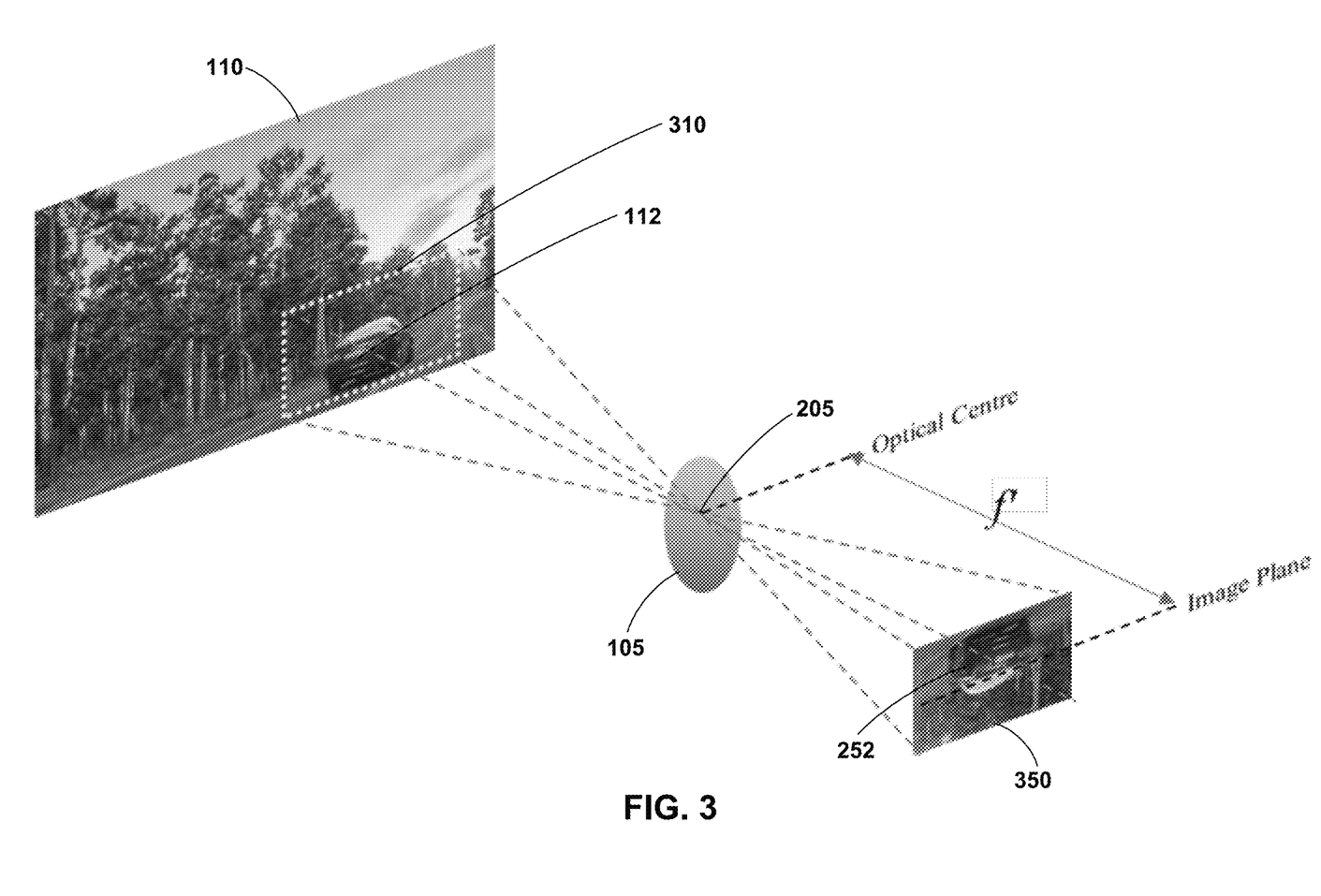
FIG. 3 is a conceptual diagram illustrating a perspective view of another example image of a real-world scene captured via a camera, in accordance with one or more techniques of this disclosure. disclosure.

FIG. 3 is a conceptual diagram illustrating a perspective view of another example image 350 of a real-world scene 310 captured via a camera, in accordance with one or more techniques of this disclosure. The example of FIG. 3 is similar to that shown in FIG. 2, but with lens 105 having a focal length f' that is longer than f. The example shown in FIG. 3 includes real-world scene 310 as a portion of real-world scene 110, lens 105, and image 350. In the example shown, real-world scene 310 includes object of importance 112 and image 350 of real-world scene 310 includes feature 252. In the example shown, feature 252 may be the corresponding image of object of importance 112.

In the example shown, image 350 of real-world scene 310 is formed at f' by lens 105. In some examples, an array of sensors, e.g., a focal plane array of camera pixels, may be positioned at f' so as to capture image 350, for example, as a digital image. In the example shown, the field of view is illustrated by the dashed lines from each corner of image 350 through optical center 205 of lens 105 to an opposing corner of real-world scene 110. In some examples, optical center 205 of lens 105 may be a cardinal point of lens 105, for example, a nodal point of lens 105.

In the example shown, because the focal length of lens 105 in the example shown in longer as compared with the example shown in FIG. 2, the image 350 may be a zoomed-in image. For example, the image 350 may fill the entire focal plane array yet correspond to only a portion of real-world scene 110, e.g., the image 350 may correspond to real-world scene 310.

Figure 4:
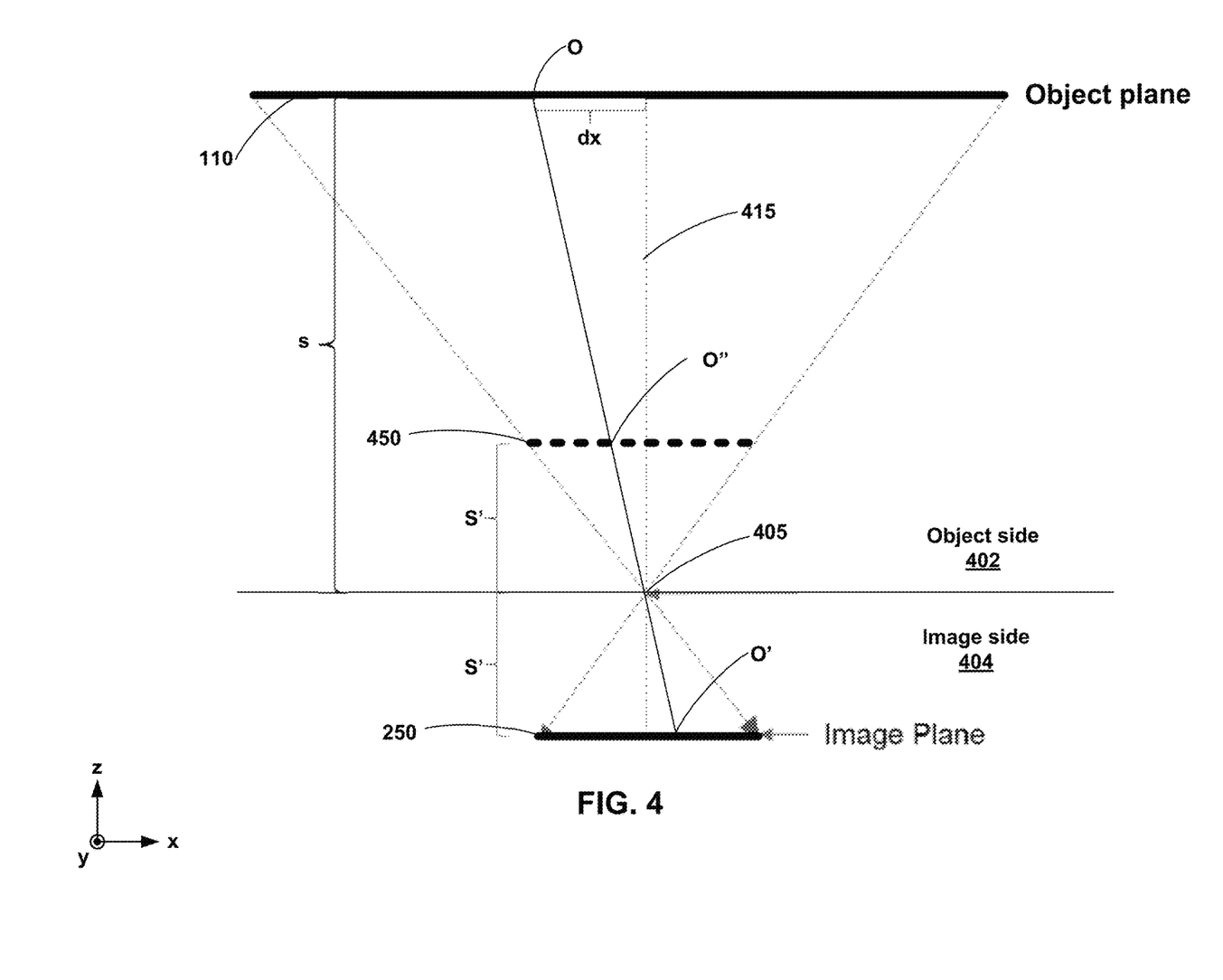
FIG. 4 is a conceptual diagram illustrating a cross-sectional view of an example pinhole camera model of a camera system, in accordance with one or more techniques of this disclosure.

FIG. 4 is a conceptual diagram illustrating an example pinhole camera model of a camera system, in accordance with one or more techniques of this disclosure. The example includes image 250 of real-world scene 110 as formed via pinhole 405, and projected image 450. The example also includes an object point O of the real-world scene 110, the corresponding image point O' and projected image point O". The example illustrates a cross-sectional plane of a pinhole camera imaging system that includes optic axis 415 and may be rotationally symmetric about optic axis 415. In some examples, pinhole 405 may be optical center 205.

In the example shown, the real-world scene 110 is located a distance s from pinhole 405 on object side 402 of pinhole 405. In some examples, when s is large and the diameter of pinhole 405 is small, an image 250 may form at a distance s' from pinhole 405 on image side 404 having magnification m=s'/s. For sufficiently large object distances s, the pinhole model may approximate a camera system such as illustrated in FIGS. 2-3.

In the example shown, object point O of real-world scene 110 may be imaged to object point O' of image 250. That is, object point O may be conjugate to image point O'. In the example shown, projected image 450 projected image 450 may be a mirror-image of image 250 on object side 402. Projected image 450 Projected image 450 may be located the same distance s' from pinhole 405 as image 250 and in the opposite direction. Projected image 450 Projected image 450 may be the same magnitude size as image 250, for example, the magnification of projected image 450 projected image 450 may be m'=−m=−s'/s. As illustrated, projected image point O" may be located at a distance from pinhole 405 that is the same magnitude, but opposite direction, as the distance between pinhole 405 and image point O".

In some examples, the locations and angles of features and points on object side 402 may be specified in an earth-frame coordinate system. For example, the distance of projected image point O" may be specified by a distance between pinhole 405 and projected image point O", which may have a z component having a magnitude of s', e.g., the distance between projected image 450 and pinhole 405, and an x component having a magnitude equal to the distance between projected image O" and the intersection of optic axis 415 and the x-y plane of projected image 450. In some examples, the distance of projected image point O" from pinhole 405 and the angle of a straight line connecting pinhole 405 and projected image point O" with respect to optic axis 415 may be directly related to the corresponding distance and angle of image point O' on image side 404 and specified in image-frame coordinates, e.g., actuation-frame coordinates of a gimbal on which the camera is mounted. In some examples, the direct relation may be that the distance and angle of O" is equal in magnitude and opposite in sign the distance and angle of O'. In some examples, a conversion to an earth-frame coordinate system may be performed to determine distances and angles of features in real-world scene 110 from distances and angles of the corresponding features in image 250 in an image coordinate system. In some examples, determination of distances and angles of features in real-world scene 110 based on distances and angles of the corresponding features in image 250 may be simplified by basing the determination on the corresponding distances and angles of the corresponding features in projected image 450, e.g., projected image 450 being in the same earth-frame coordinate system as real-world scene 110.

Figure 5:
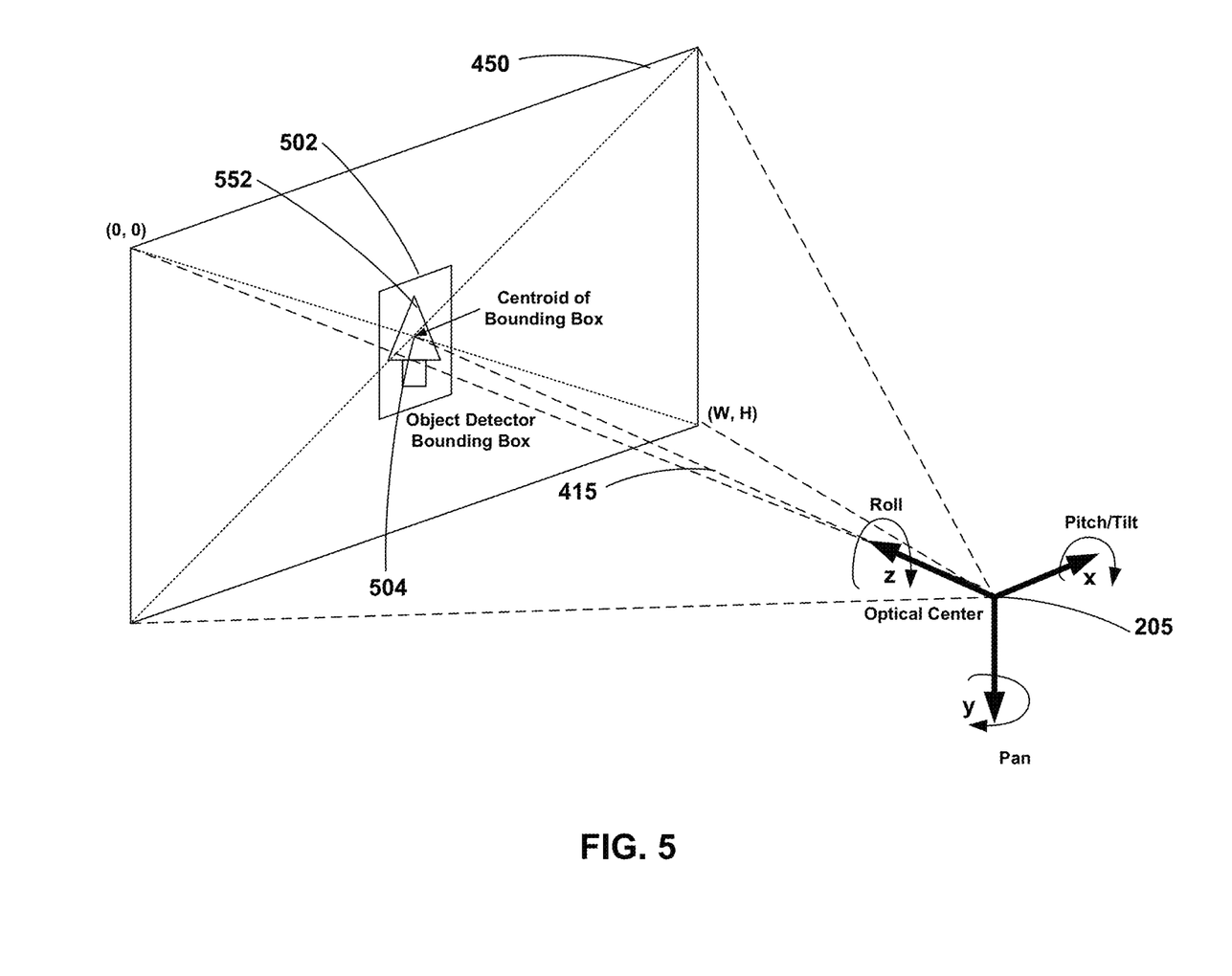
FIG. 5 is a conceptual diagram illustrating a perspective view of an example projected image of a real-world scene, in accordance with one or more techniques of this disclosure.
Figure 6:
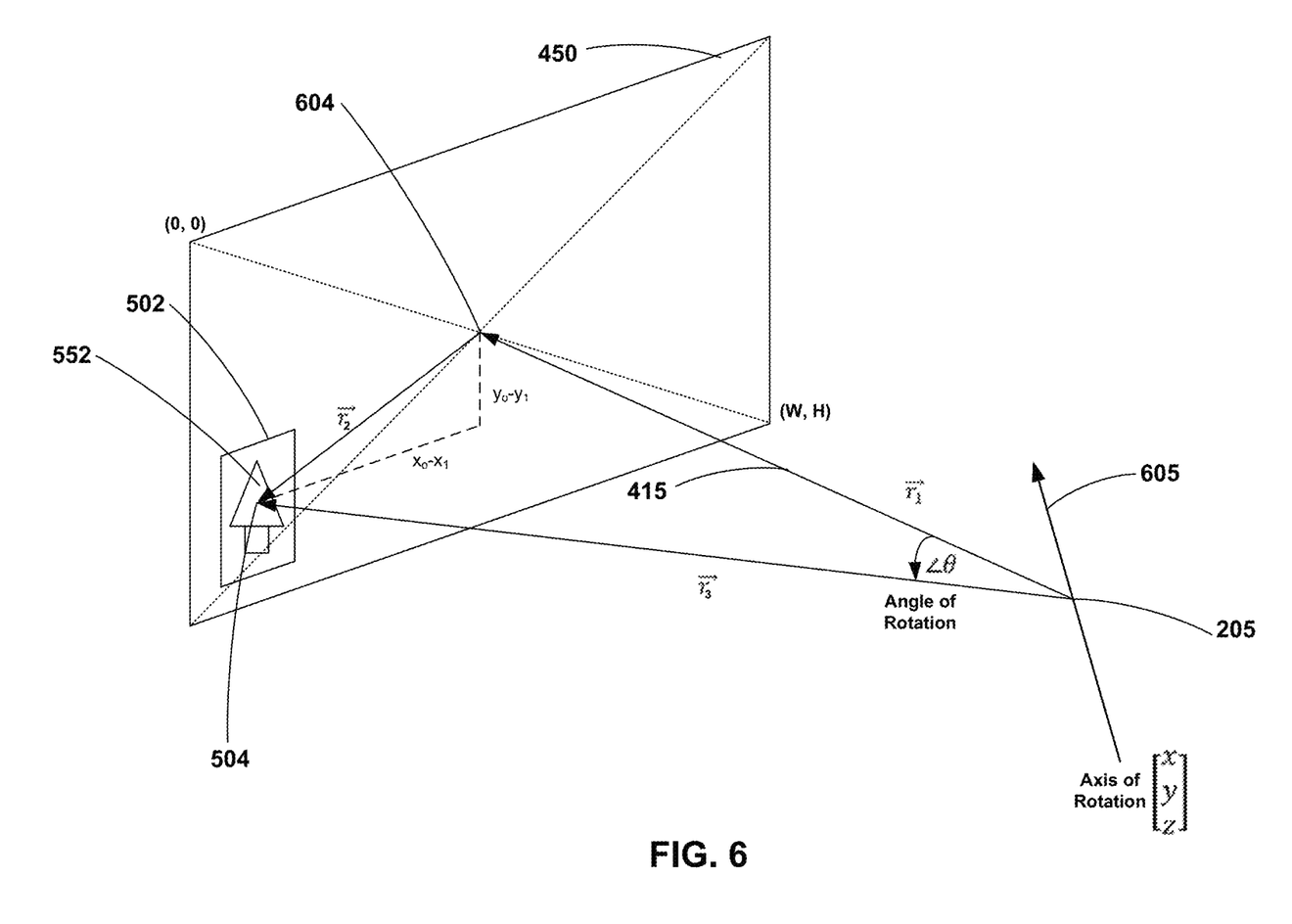
FIG. 6 is a conceptual diagram illustrating an example rotation axis and rotation angle in the actuation frame coordinate system, in accordance with one or more techniques of this disclosure.

FIGS. 5-6 are described below as perspective views of an example projected image 450 of a real-world scene in earth-frame coordinates, for example, real-world scene 110 as illustrated in FIGS. 2-4. The descriptions below of FIGS. 5-6 may also be equivalent to an example image 250 of a real-world scene in actuation-frame coordinates, for example, as illustrated in FIG. 4.

FIG. 5 is a conceptual diagram illustrating a perspective view of an example projected image 450 of a real-world scene, in accordance with one or more techniques of this disclosure. The example shown in FIG. 5 illustrates roll, pan, and tilt angles in an earth-frame coordinate system with respect to optic axis 415 at optical center 205. In some examples, a gimbal on which the camera is mounted may adjust roll, pan, and tilt angles in an earth-frame coordinate system, for example, to track object of interest 112 via feature 252 captured in image 250 and corresponding feature 552 in projected image 450. Each of the roll, pan, and tilt angles in the earth-frame coordinate system may be related to distances and angles of feature 552 with respect to projected image 450 and optical center 205 by a conversion, as described further below with respect to FIGS. 6-7. In some examples, the roll, pan, and tilt angle adjustments in the earth-frame coordinate system may be determined directly from quantities, e.g. distances and angles, of feature 552 in the actuation-frame coordinate system directly and without performing a conversion between the actuation-frame and the earth-frame, and in some examples a gimbal on a servo-motor mount may servo the camera mounted on the gimbal by a roll, pan, and/or tilt angle without having to adjust a servoing control-loop gain.

In the example shown, feature 552 is within bounding area 502. In some examples, bounding area 502 is determined based on feature 552. For example, image 250 may be captured and stored in memory as a digital image. The image information of image 250 may directly correspond to the image information of projected image 450, and a processor may determine bounding area 502 via analytical, regression, and/or machine learning based techniques. In some examples, such techniques may determine the boundary of feature 552 from a single image, or a sequence of images captured at different times, e.g., a video stream. In some examples, the individual pixels of feature 552 may be weighted, for example, based on image brightness, color, movement from frame to frame, or any other image feature attribute. In some examples, bounding area 502 may be rectangular, and in other examples bounding area 502 may be irregularly shaped. In some examples, centroid 504 corresponds to the geometric center of bounding area 502, e.g., the pixel location in projected image 450 corresponding to a pixel location in image 250 that is the geometric center of bounding area 502. In some examples, a plurality of bounding areas 502 may be determined, for example, based on a plurality of features 552. In addition, a plurality of centroids 504 may be determined, each corresponding with each of the plurality of bounding areas 502, and global bounding area and a global centroid may be determined based on the plurality of bounding areas and plurality of centroids.

In the example shown, the projected image 450 (and image 250) may have an area of W×H. For example, projected image 450 may have a width W and a height H. In some examples, projected image 450 may be an array of pixels. In the example shown, the upper left corner of projected image 450 may have a width and height coordinate of (0, 0), which may correspond to pixel (0, 0). The lower right corner of projected image 450 may have a width and height coordinate of (W, H), which may correspond to pixel (M−1, N−1), where M and N are an integer number of pixels in the width and height directions of projected image 450, respectively. The center of projected image 450 may have a pixel location of $(x_0, y_0)$, where $x_0=M/2-1$ and $y_0=N/2-1$.

In the example shown, a roll angle is illustrated as a rotation angle about the z-axis, e.g., optic axis 415, and rotating a camera having optical center 205 by a roll angle results in a rotation of the scene imaged in projected image 450 and image 250. Similarly, a pan angle is illustrated as a rotation angle about the y-axis, and rotation camera having optical center 205 by a pan angle results in a horizontal translation of the scene imaged in projected image 450 and image 250. A pitch angle, or equivalently a tilt angle, is illustrated as a rotation angle about the x-axis, and rotation camera having optical center 205 by a tilt angle results in a vertical translation of the scene imaged in projected image 450 and image 250.

FIG. 6 is a conceptual diagram illustrating a perspective view of an example projected image 450 of a real-world scene in earth-frame coordinates, in accordance with one or more techniques of this disclosure. The example shown in FIG. 6 illustrates vectors on which a rotation angle θ about rotation axis 605 may be based, for example, to track feature 552. In some examples, roll, pan, and tilt angles for tracking and/or centering feature 552 in image 250, and projected image 450, may be determined based on angle of rotation angle θ and rotation axis 605. In some examples, rotation angle θ, rotation axis 605, and roll, pan, and tilt angles may be determined in an earth-frame coordinate system, and in other examples may be determined in an actuation-frame coordinate system.

In the example shown, feature 552 is located off-center in projected image 450. Centroid 504 of bounding area 502 is located at pixel location $(x_1, y_1)$. In the example shown, vector $r_2$ is within the plane of projected image 450 and originates from the center 604 of projected image 450, e.g., at pixel location $(x_0, y_0)$. The terminal end of vector $r_2$ is $(x_1, y_1)$. The magnitude of vector $r_2$ is the Euclidean distance between $(x_0, y_0)$ and $(x_1, y_1)$, e.g., the square root of $((x_1-x_0)^2, (y_1-y_0)^2)$.

In the example shown, vector $r_1$ is perpendicular to the plane of projected image 450, originates from the optical center 205, and terminates at the center of projected image 450. The magnitude of vector $r_1$ is the image distance, e.g., s' as illustrated in FIG. 4. In some examples, the image distance s' may be substantially the same as the focal length of the camera lens, e.g., lens 105. For example, s' may be substantially the same as the focal length of the camera lens for sufficiently large distances between optical center 205 and real-world scene 110, e.g., sufficiently large distance s. In other words, s' may be substantially the same as the focal length of the camera lens for an object distance s that approaches infinity. In some examples, an object distance s may vary depending on the camera and camera lens, e.g., an object distance that approaches infinity may be several feet, may be several miles, or may be less than one meter, may be less than 100 meters, may be less than 1 kilometer, may be less than 100 kilometers, or may be more than 100 kilometers. In the example shown, vector $r_3$ originates from the optical center 205, and terminates at centroid 504, e.g., $(x_1, y_1)$.

In some examples, vectors $r_1$, $r_2$, and $r_3$ may be normalized in units of image pixels. For example the focal length of the camera lens may be converted to units of pixels $f_{pix}=f/\Delta p$, where Δp is the size of a camera pixel, e.g., the width and/or height of a pixel. Vectors $r_1$, $r_2$, and $r_3$ may then be $r_1=f_{pix}k$, $r_2=(x_1-x_0)i+(y_1-y_0)j$, where i, j, k are unit vectors in the x, y, and z-axis directions, respectively. The vector $r_3=r_1+r_2$, via vector addition.

In the example shown, vectors $r_1$ and $r_3$ may be in an actuation-frame coordinate system. Roll, pan, and tilt angles to track feature 552, e.g., servo the camera such that feature 552 is substantially centered in image 250 and projected image 450, may be determined by a conversion from actuation-frame to earth-frame via a quaternion. For example, rotation angle θ may be the angle at which the camera may be rotated about rotation axis 605 such that centroid 504 is substantially co-located with center 604 of projected image 450. Rotation angle θ may be determined via Equation (1):

$$\theta = \sin^{-1}\left(\frac{\vec{r_1}\cdot\vec{r_3}}{|\vec{r_1}|\cdot|\vec{r_3}|}\right) \quad (1)$$

Rotation axis 605 may be determined via Equation (2):

$$\begin{bmatrix} X \\ Y \\ Z \end{bmatrix} = \frac{\vec{r_1}\times\vec{r_3}}{|\vec{r_1}|\times|\vec{r_3}|} \quad (2)$$

In the example shown, rotation axis 605 is perpendicular to a plane containing vectors $r_1$, $r_2$, and $r_3$, and is parallel to the plane of projected image 450.

In some examples, a quaternion may be determined via Equation (3):

$$q_0 = \cos\left(\frac{\theta}{2}\right) \quad (3)$$
$$q_1 = X*\sin\left(\frac{\theta}{2}\right)$$
$$q_2 = Y*\sin\left(\frac{\theta}{2}\right)$$
$$q_3 = Z*\sin\left(\frac{\theta}{2}\right)$$

In some examples, a quaternion in an actuation-frame coordinate system may be converted to a known rotation sequence, e.g., roll, pan, and tilt angles in an earth-frame coordinate system. In some examples, roll, pan, and tilt angles may be converted via an Euler 312 sequence, and may be determined via Equation (4):

$$\Delta\psi = \tan^{-1}\left(\frac{2*(q_3*q_4 - q_1*q_2)}{q_4^2 + q_1^2 - q_2^2 - q_3^2}\right) \quad (4)$$
$$\Delta\theta = \sin^{-1}(2*q_2*q_4 - q_1*q_3)$$
$$\Delta\varphi = \tan^{-1}\left(\frac{2*(q_1*q_4 - q_3*q_2)}{q_4^2 + q_{41}^2 - q_2^2 + q_3^2}\right)$$

where $\Delta\psi$ is a pan angle, $\Delta\theta$ is a tilt angle, and $\Delta\varphi$ is a roll angle. In other examples, roll, pan, and tilt angles may be converted via an Euler 321 sequence, or any other sequence, and may be determined via corresponding equations for roll, pan, and tilt angles.

In some examples, vectors $r_1$ and $r_3$ may be converted to the earth-frame coordinate system before rotation angle $\theta$ and axis 605 are determined, and a quaternion obtained via vectors $r_1$ and $r_3$ may be directly used to generate the Euler angles pan, tilt, and roll for the gimbal. In some examples, $\Delta\psi$, $\Delta\theta$, and $\Delta\varphi$ may be repeatedly corrected to keep centroid 504 at center 604 of projected image 450, thereby tracking object of interest 112.

Figure 7:
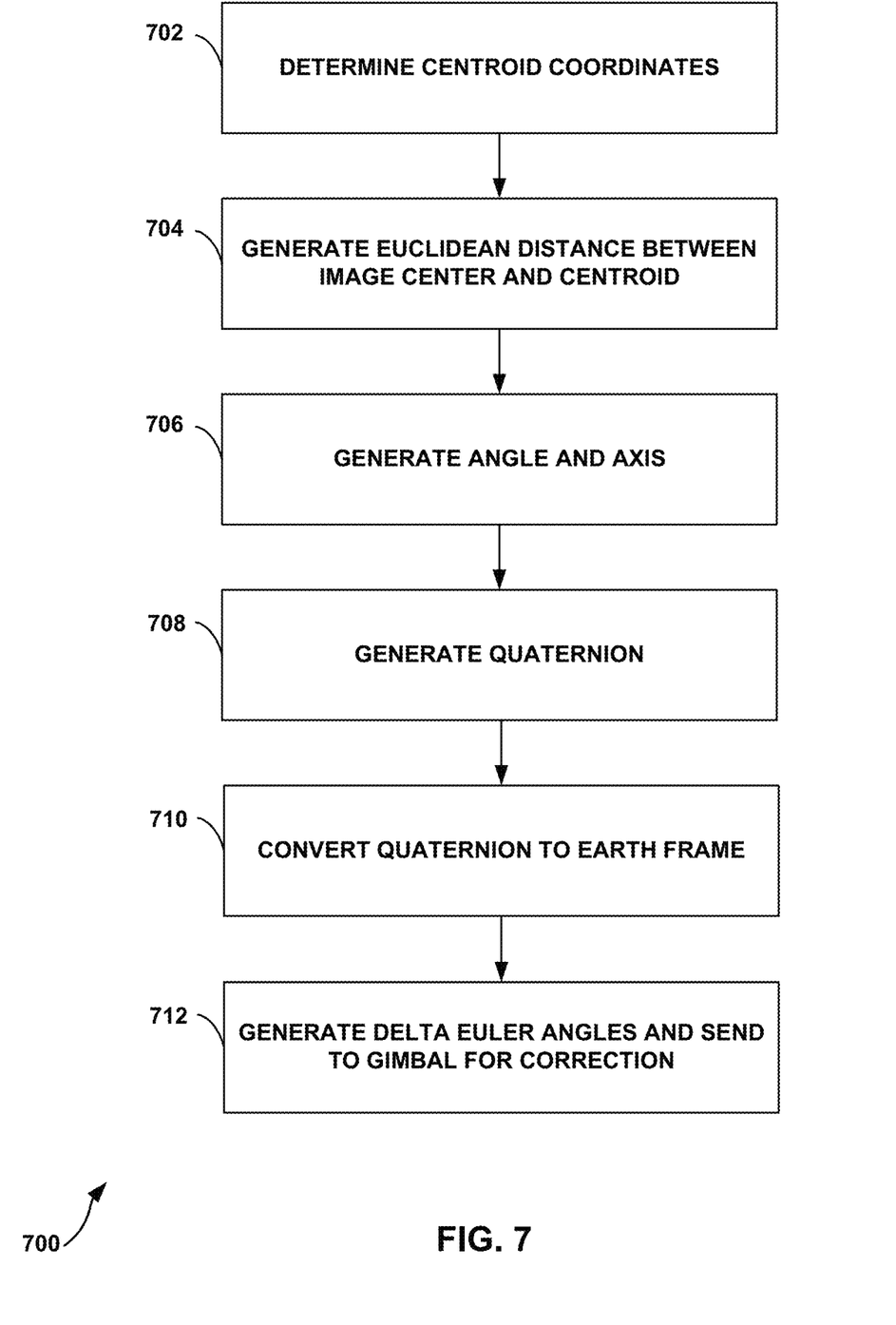
FIG. 7 is a flowchart of an example method of tracking an object, in accordance with one or more techniques of this disclosure.

FIG. 7 is a flowchart of an example method 700 of tracking an object, in accordance with one or more techniques of this disclosure. The example method is described with respect to the imaging systems of FIGS. 2-6. The example method may be performed, for example, by a computing device, such as computing device 106, executing the steps of the method on an image of a real-world scene captured by a camera.

At determine centroid coordinates step 702, computing device 106 may determine a bounding area based on a feature captured in an image that corresponds to an object of interest in a real-world scene, for example, bounding area 502. Computing device 106 may determine the coordinates of a centroid of the bounding area within the image. For example, computing device 106 may determine the pixel coordinates of centroid 504 in image 250 and/or projected image 450.

At generate Euclidean distance between image center and centroid step 704, computing device 106 may determine the distance from the centroid to the image center. For example, computing device 106 may determine the vector $r_2$.

At generate angle and axis step 706, computing device 106 may determine the angle of rotation of the camera about a rotation axis such that the centroid is substantially co-located with the image center. For example, computing device 106 may determine rotation angle $\theta$ and rotation axis 605 at step 706 based on the focal length of the camera and the Euclidean distance between image center and centroid, e.g., vector $r_2$.

At generate quaternion step 708, computing device 106 may determine a quaternion in an actuation frame based on the determined rotation angle and rotation axis. For example, computing device 106 may determine $[q_1, q_2, q_3, q_4]$ based on rotation angle $\theta$ and rotation axis 605.

At generate delta Euler angles and send to gimbal for correction step 710, computing device 106 may determine the pan, tilt, and roll angles to servo the gimbal such that the determined centroid may be substantially co-located with the image center. For example, computing device 106 may determine $\Delta\psi$, $\Delta\theta$ and $\Delta\varphi$ and communicate the determined $\Delta\psi$, $\Delta\omega$ and $\Delta\varphi$ to a gimbal on which the camera is mounted. Additionally, the gimbal may servo the camera by $\Delta\psi$, $\Delta\theta$, and $\Delta\varphi$, thereby tracking an object of interest in a real-world scene without determining a distance between the camera and the object of interest. In some examples, the method 700 allows for automatic change of the delta Euler angles $\Delta\psi$, $\Delta\theta$, and $\Delta\varphi$ based on a change in the focal length of the camera lens, e.g., zooming in and/or out, and thereby allows changing focal length and servoing without having to change a gain of the control loop of the gimbal. In addition, the lens of the camera, or the entire camera, may be replaced without necessitating a change to method 700, and without changing an algorithm executed by processor circuitry carrying out method 700, and without changing a gain of the control loop of the gimbal.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method of tracking an image feature, the method comprising:
   acquiring an image with a camera;
   determining, using processing circuitry, a bounding area in the image, the bounding area surrounding a feature in the image;

determining, using the processing circuitry, a position of a centroid of the bounding area in the image relative to a center of the image;

determining, using the processing circuitry, a first vector between the center of the image and an optical center of a lens of the camera, a second vector between the centroid and the center of the image, and a third vector between the centroid and the optical center of the lens of the camera;

determining, using the processing circuitry, a rotation axis based on a cross-product of the first vector and the third vector;

determining, using the processing circuitry, a rotation angle based on a dot-product of the first vector and the third vector;

determining, using the processing circuitry, at least one of a pan angle, a roll angle, and a tilt angle for the camera based on the rotation axis and the rotation angle; and adjusting, using a gimbal, an orientation of the camera based on the at least one of the pan angle, the roll angle, and the tilt angle.

2. The method of claim 1, wherein determining at least one of the pan angle, the roll angle, and the tilt angle for the camera at which the bounding area is centered in the image further comprises:

determining a quaternion in an actuation frame based on the rotation axis and the rotation angle;

converting the quaternion to earth-frame coordinates; and determining the at least one of the pan angle, the roll angle, and the tilt angle for the camera at which the bounding area is centered in the image based on the quaternion in the earth-frame coordinates.

3. The method of claim 1, wherein adjusting the orientation of the camera based on the at least one of the pan angle, the roll angle, and the tilt angle results in the centroid of the bounding area being substantially co-located with the center of the image.

4. The method of claim 1, wherein adjusting the orientation of the camera based on the at least one of the pan angle, the roll angle, and the tilt angle comprises servoing the gimbal while maintaining a servoing control-loop gain.

5. The method of claim 1, further comprising:

acquiring a second image with the camera having a second focal length different from the first focal length, wherein the second image includes the feature;

determining, using the processing circuitry, a second image bounding area, the second image bounding area surrounding the feature in the second image;

determining, using the processing circuitry, a second rotation axis and a second rotation angle based on the second focal length and a position of the second image bounding area relative to a center of the second image;

determining, using the processing circuitry, at least one of a pan angle, a roll angle, and a tilt angle for the camera at which the second image bounding area is centered in the second image; and adjusting, using the gimbal, an orientation of the camera based on the at least one of the pan angle, the roll angle, and the tilt angle.

6. The method of claim 1, wherein the bounding area is a first bounding area, wherein the feature is a first feature, wherein the position of the centroid is a first position of a first centroid, the method further comprising:

determining, using the processing circuitry, a second bounding area in the image, the second bounding area surrounding a second feature in the image;

determining, using the processing circuitry, a second position of a second centroid of the second bounding area in the image relative to the center of the image; and determining, using the processing circuitry, a global centroid position based on the first position of the first centroid and the second position of the second centroid;

wherein the second vector is determined between the global centroid and the center of the image, wherein the third vector is determined between the global centroid and the optical center of the lens of the camera.

7. A system comprising:

a camera; and processing circuitry configured to:
  receive, from the camera, an image including at least one feature;
  determine a bounding area in the image surrounding the at least one feature;
  determine a position of a centroid of the bounding area in the image relative to a center of the image;
  determine a first vector between the center of the image and an optical center of a lens of the camera, a second vector between the centroid and the center of the image, and a third vector between the centroid and the optical center of the lens of the camera;
  determine a rotation axis based on a dot-product of the first vector and the third vector
  determine a rotation angle based on a dot-product of the first vector and the third vector;
  determine at least one of a pan angle, a roll angle, and a tilt angle for the camera based on the rotation axis and the rotation angle; and
  adjust, using a gimbal, an orientation of the camera about the rotation axis and the rotation angle based on the at least one of the pan angle, the roll angle, and the tilt angle.

8. The system of claim 7, wherein the processing circuitry is further configured to:

determine a quaternion in an actuation frame based on the rotation axis and the rotation angle;

convert the quaternion to earth-frame coordinates; and determine at least one of the pan angle, the roll angle, and the tilt angle for the camera at which the bounding area is centered in the image based on the quaternion in the earth-frame coordinates.

9. The system of claim 7, wherein the camera is attached to the gimbal, and wherein the gimbal is attached to a vehicle.

10. The system of claim 9, wherein the vehicle comprises an unmanned aerial vehicle.

11. The system of claim 8, wherein adjustment of the orientation of the camera via the gimbal results in the centroid of the bounding area being substantially co-located with the center of the image.

12. The system of claim 7, wherein adjustment the orientation of the camera comprises servoing the gimbal while maintaining a servoing control-loop gain.

13. The system of claim 7, wherein the processing is further configured to:

acquire a second image with the camera having a second focal length different from the first focal length, wherein the second image includes the feature;

determine a bounding area in the second image, a second image bounding area surrounding the feature in the second image;

determine a second rotation axis and a second rotation angle based on the second focal length and a position of the second image bounding area relative to a center of the second image;

determine at least one of a pan angle, a roll angle, and a tilt angle for the camera at which the second image bounding area is centered in the second image; and adjust, using the gimbal, an orientation of the camera based on the at least one of the pan angle, the roll angle, and the tilt angle.

14. The system of claim 7, wherein the processing circuitry is further configured to:

automatically determine at least one of a pan angle, a roll angle, and a tilt angle for the camera at which the bounding area is centered in the image after a first lens of the camera has been replaced by a second lens having a second focal length different from a first focal length of the first lens.

15. The system of claim 13, wherein the first camera is replaced with a second camera, wherein the second image is acquired with the second camera.

16. The system of claim 9, wherein the bounding area is a first bounding area, wherein the feature is a first feature, wherein the position of the centroid is a first position of a first centroid, the method, wherein the processing circuitry is further configured to:

determine a second bounding area in the image, the second bounding area surrounding a second feature in the image;

determine a second position of a second centroid of the second bounding area in the image relative to the center of the image; and determine a global centroid position based on the first position of the first centroid and the second position of the second centroid, wherein the second vector is determined between the global centroid and the center of the image, wherein the third vector is determined between the global centroid and the optical center of the lens of the camera.

17. The method of claim 3, wherein $\theta$ is the rotation angle, wherein X, Y, Z comprise the rotation axis, wherein the quaternion comprises $q_0, q_1, q_2, q_3$, wherein determining the quaternion comprises determining the quaternion according to:

$$q_0 = \cos\left(\frac{\theta}{2}\right)$$
$$q_1 = X * \sin\left(\frac{\theta}{2}\right)$$
$$q_2 = Y * \sin\left(\frac{\theta}{2}\right)$$
$$q_3 = Z * \sin\left(\frac{\theta}{2}\right).$$

18. The method of claim 17, wherein $\Delta_\psi$ is the pan angle, $\Delta\theta$ is the tilt angle, and $\Delta_\psi$ is the roll angle, wherein determining the at least one of a pan angle, a roll angle, and a tilt angle comprises determining the at least one of a pan angle, a roll angle, and a tilt angle according to:

$$\Delta\psi = \tan^{-1}\left(\frac{2*(q_3*q_4 - q_1*q_2)}{q_4^2 + q_1^2 - q_2^2 - q_3^2}\right)$$
$$\Delta\theta = \sin^{-1}(2*q_2*q_4 - q_1*q_3)$$
$$\Delta\varphi = \tan^{-1}\left(\frac{2*(q_1*q_4 - q_3*q_2)}{q_4^2 + q_{41}^2 - q_2^2 + q_3^2}\right).$$

* * * * *